United States Patent
Tokuda

(10) Patent No.: US 10,698,198 B2
(45) Date of Patent: Jun. 30, 2020

(54) PIXEL CLOCK GENERATING DEVICE, IMAGE WRITING DEVICE, AND IMAGE FORMING APPARATUS

(71) Applicant: Masashi Tokuda, Kanagawa (JP)

(72) Inventor: Masashi Tokuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/834,665

(22) Filed: Dec. 7, 2017

(65) Prior Publication Data

US 2018/0241903 A1 Aug. 23, 2018

(30) Foreign Application Priority Data

Feb. 20, 2017 (JP) ................. 2017-029146

(51) Int. Cl.
*B41J 2/44* (2006.01)
*B41J 2/47* (2006.01)
(Continued)

(52) U.S. Cl.
CPC ............ *G02B 26/127* (2013.01); *B41J 2/442* (2013.01); *B41J 2/471* (2013.01); *G02B 26/122* (2013.01);
(Continued)

(58) Field of Classification Search
CPC ........... H01N 1/053; B41J 2/442; B41J 2/471; G02B 26/122; G02B 26/127;
(Continued)

(56) References Cited

U.S. PATENT DOCUMENTS 5,861,824 A    1/1999  Ryu et al.
6,977,747 B1 * 12/2005 Matsukubo ............ G06K 15/02
                                                                358/1.13
(Continued)

FOREIGN PATENT DOCUMENTS

JP    2006-259360    9/2006
JP    2006-305780    11/2006
JP    2007-210201    8/2007

*Primary Examiner* — Alessandro V Amari
*Assistant Examiner* — Kendrick X Liu
(74) *Attorney, Agent, or Firm* — Harness, Dickey & Pierce, P.L.C.

(57) ABSTRACT

A pixel clock generating device includes a high-frequency clock generator, a comparer, a pixel clock generator, and a value switcher. The high-frequency clock generator is configured to generate a high-frequency clock. The comparer is configured to measure a time interval between a leading-end synchronizing signal and a trailing-end synchronizing signal in a main scanning and calculate an error between the time interval and a target value. The pixel clock generator is configured to generate a pixel clock based on the high-frequency clock and a pixel clock frequency and correct the pixel clock based on the error. The value switcher, including a plurality of groups of values with which the pixel clock is generated, is configured to switch between the plurality of groups of values according to a switching signal after the trailing-end synchronizing signal is inputted, the comparer calculates the error, and the pixel clock generator corrects the pixel clock.

20 Claims, 12 Drawing Sheets

(51) Int. Cl.

| | |
|---|---|
| *G02B 26/12* | (2006.01) |
| *G03G 15/043* | (2006.01) |
| *G06K 15/12* | (2006.01) |
| *H04N 1/21* | (2006.01) |
| *H04N 1/00* | (2006.01) |
| *H04N 1/053* | (2006.01) |
| *G03G 15/30* | (2006.01) |

(52) U.S. Cl.
CPC ......... *G02B 26/129* (2013.01); *G03G 15/043* (2013.01); *G03G 15/305* (2013.01); *G06K 15/1219* (2013.01); *G06K 15/1223* (2013.01); *H04N 1/00745* (2013.01); *H04N 1/053* (2013.01); *H04N 1/2133* (2013.01)

(58) Field of Classification Search
CPC ............... G02B 26/129; G03G 15/043; G06K 15/1219; G06K 15/1223
See application file for complete search history.

(56) References Cited

U.S. PATENT DOCUMENTS

| | | | |
|---|---|---|---|
| 2004/0125199 A1* | 7/2004 | Omori | G03G 15/043 347/249 |
| 2004/0246530 A1 | 12/2004 | Tokuda | |
| 2008/0143814 A1 | 6/2008 | Masui et al. | |
| 2011/0221739 A1* | 9/2011 | Masui | H04N 1/053 345/213 |
| 2017/0242364 A1 | 8/2017 | Tokuda | |

* cited by examiner

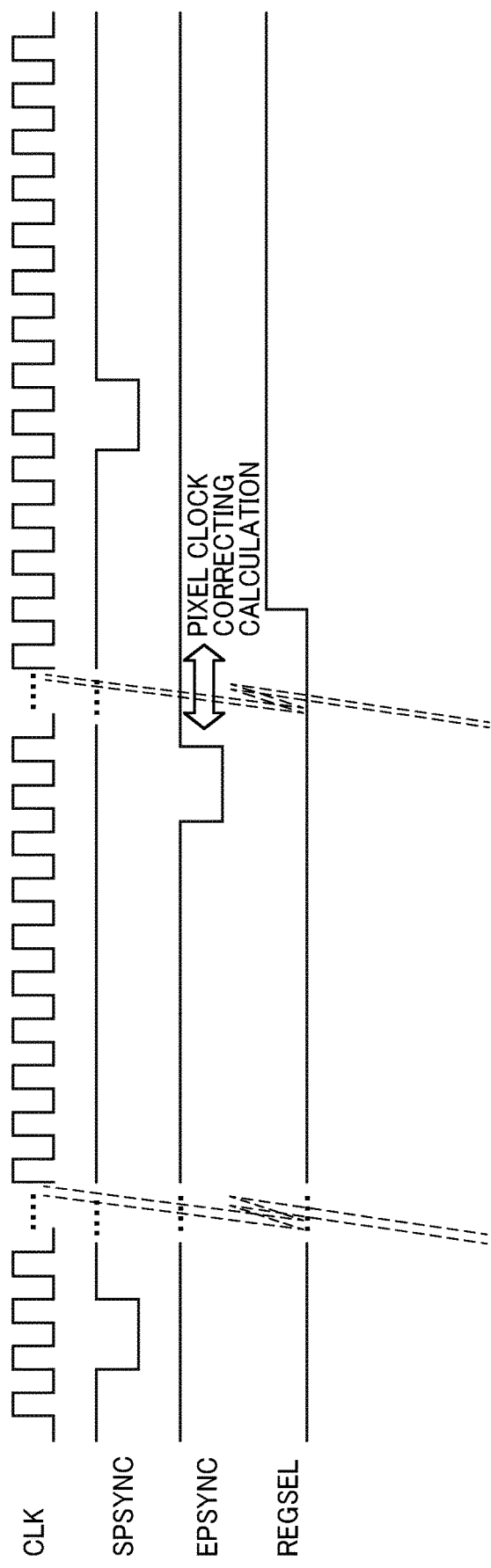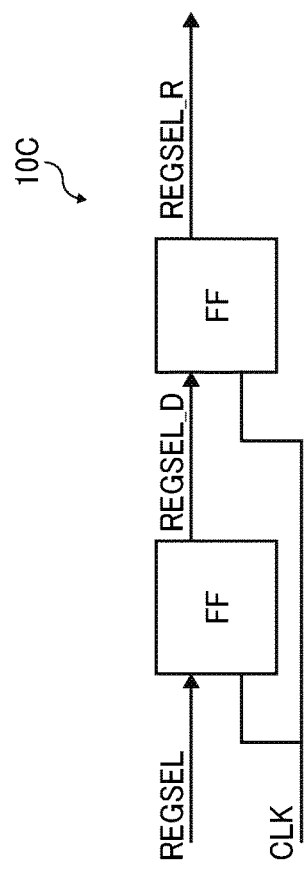

PIXEL CLOCK GENERATING DEVICE, IMAGE WRITING DEVICE, AND IMAGE FORMING APPARATUS

CROSS-REFERENCE TO RELATED APPLICATION

This patent application is based on and claims priority pursuant to 35 U.S.C. § 119(a) to Japanese Patent Application No. 2017-029146, filed on Feb. 20, 2017, in the Japan Patent Office, the entire disclosure of which is hereby incorporated by reference herein.

BACKGROUND

Technical Field

Embodiments of the present disclosure generally relate to a pixel clock generating device, an image writing device, and an image forming apparatus, and more particularly, to a pixel clock generating device, an image writing device incorporating the pixel clock generating device, and an image forming apparatus incorporating the image writing device.

Related Art

Various types of electrophotographic image forming apparatuses are known, including copiers, printers, facsimile machines, and multifunction machines having two or more of copying, printing, scanning, facsimile, plotter, and other capabilities. Such image forming apparatuses usually form an image on a recording medium according to image data. Specifically, in such image forming apparatuses, for example, a charger uniformly charges a surface of a photoconductor as an image bearer. An optical writer or image writing device irradiates the surface of the photoconductor thus charged with a light beam to form an electrostatic latent image on the surface of the photoconductor according to the image data. A developing device supplies toner to the electrostatic latent image thus formed to render the electrostatic latent image visible as a toner image. The toner image is then transferred onto a recording medium either directly, or indirectly via an intermediate transfer belt. Finally, a fixing device applies heat and pressure to the recording medium bearing the toner image to fix the toner image onto the recording medium. Thus, an image is formed on the recording medium.

SUMMARY

In one embodiment of the present disclosure, a novel pixel clock generating device includes a high-frequency clock generator, a comparer, a pixel clock generator, and a value switcher. The high-frequency clock generator is configured to generate a high-frequency clock. The comparer is configured to measure a time interval between a leading-end synchronizing signal and a trailing-end synchronizing signal in a main scanning and calculate an error between the time interval and a target value. The pixel clock generator is configured to generate a pixel clock based on the high-frequency clock and a pixel clock frequency and correct the pixel clock based on the error. The value switcher includes a plurality of groups of values with which the pixel clock is generated. The value switcher is configured to switch between the plurality of groups of values according to a switching signal after the trailing-end synchronizing signal is inputted and after the comparer calculates the error and the pixel clock generator corrects the pixel clock.

Also described are a novel image writing device incorporating the pixel clock generating device and a novel image forming apparatus incorporating the image writing device.

BRIEF DESCRIPTION OF THE DRAWINGS

A more complete appreciation of the disclosure and many of the attendant advantages thereof will be more readily obtained as the same becomes better understood by reference to the following detailed description of embodiments when considered in connection with the accompanying drawings, wherein:

FIG. 10 is a timing chart illustrating a clock, synchronizing signals, a double register switching signal, and a time during which pixel clock correcting calculation is performed;

FIG. 11 is a block diagram illustrating a comparative example of a delay circuit incorporated in the pixel clock generating unit;

The accompanying drawings are intended to depict embodiments of the present disclosure and should not be interpreted to limit the scope thereof. Also, identical or similar reference numerals designate identical or similar components throughout the several views.

DETAILED DESCRIPTION

Figure 1:
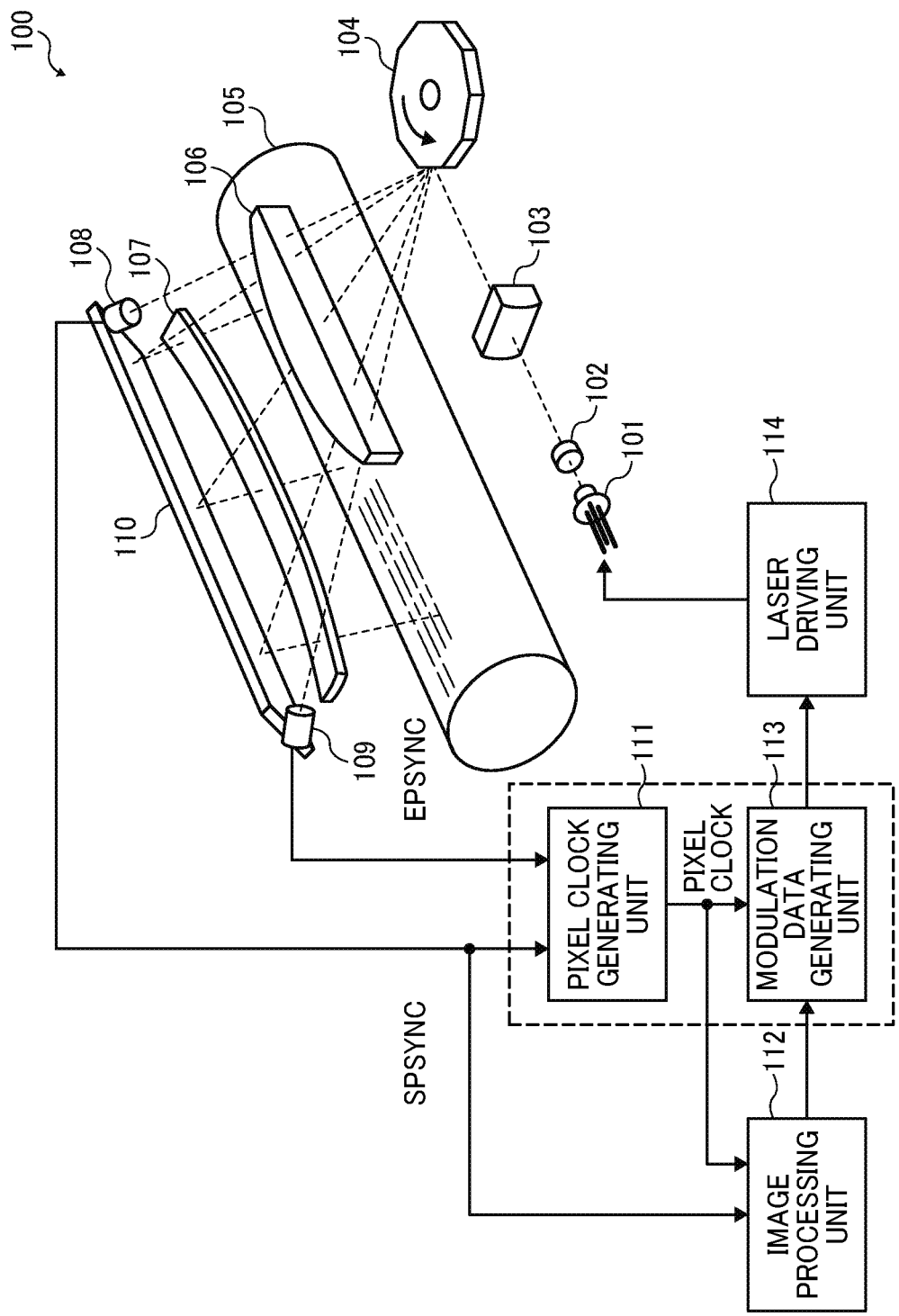
FIG. 1 is a schematic view of an image writing device according to an embodiment of the present disclosure.

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and not all of the components or elements described in the embodiments of the present disclosure are indispensable to the present disclosure.

In a later-described comparative example, embodiment, and exemplary variation, for the sake of simplicity like reference numerals are given to identical or corresponding constituent elements such as parts and materials having the same functions, and redundant descriptions thereof are omitted unless otherwise required.

As used herein, the singular forms "a", "an", and "the" are intended to include the plural forms as well, unless the context clearly indicates otherwise.

It is to be noted that, in the following description, suffixes K, Y, C, and M denote colors black, yellow, cyan, and magenta, respectively. To simplify the description, these suffixes may be omitted unless necessary.

Referring now to the drawings, wherein like reference numerals designate identical or corresponding parts throughout the several views, embodiments of the present disclosure are described below.

Initially with reference to FIG. 1, a description is given of an image writing device 100 according to an embodiment of the present disclosure.

FIG. 1 is a schematic view of the image writing device 100.

The image writing device 100 includes a semiconductor laser 101, collimator lens 102, a cylinder lens 103, a polygon mirror 104, a photoconductor 105, an f-θ lens 106, a toroidal lens 107, a first photodetector (PD1) 108, a second photodetector (PD2) 109, a mirror 110, a pixel clock generating unit 111 serving as a pixel clock generating device, an image processing unit 112, a modulation data generating unit 113, and a laser driving unit 114.

The semiconductor laser 101, serving as a light source, outputs a laser beam toward the polygon mirror 104. Before striking a surface of the polygon mirror 104, the laser beam is shaped by the collimator lens 102 and the cylinder lens 103 as the laser beam passes through collimator lens 102 and the cylinder lens 103. The polygon mirror 104, serving as a polarizer or a deflector, reflects the incident laser beam so as to periodically scan the photoconductor 105. The laser beam thus reflected reaches the photoconductor 105 via the f-θ lens 106, the mirror 110, and the toroidal lens 107, thus forming an optical spot on the photoconductor 105. Thus, an electrostatic latent image is formed on the photoconductor 105 according to an output of the semiconductor laser 101.

The first photodetector (PD1) 108 and the second photodetector (PD2) 109 are disposed on opposed lateral ends of the mirror 110 to detect the start and end of scanning. Specifically, the laser beam reflected from the polygon mirror 104 strikes the first photodetector (PD1) 108 as an incident laser beam before scanning the surface of the photoconductor 105 in one line. After completing the scanning, the laser beam strikes the second photodetector (PD2) 109 as an incident laser beam. The first photodetector (PD1) 108 converts the incident laser beam into a leading-end synchronizing signal SPSYNC, and supplies the leading-end synchronizing signal SPSYNC to the pixel clock generating unit 111. Similarly, the second photodetector (PD2) 109 converts the incident laser beam into a trailing-end synchronizing signal EPSYNC, and supplies the trailing-end synchronizing signal EPSYNC to the pixel clock generating unit 111.

From the leading-end synchronizing signal SPSYNC and the trailing-end synchronizing signal EPSYNC, the pixel clock generating unit 111 measures a time interval at which the laser beam scans between the first photodetector (PD1) 108 and the second photodetector (PD2) 109. Then, the pixel clock generating unit 111 generates a pixel clock PCLK having a frequency obtained such that the time interval includes a predetermined number of clocks. Thereafter, the pixel clock generating unit 111 supplies the pixel clock PCLK to the image processing unit 112 and the modulation data generating unit 113. A detailed description of a configuration of the pixel clock generating unit 111 is deferred.

The leading-end synchronizing signal SPSYNC, which is an output signal from the first photodetector (PD1) 108, is supplied to the image processing unit 112, in addition to the pixel clock generating unit 111, as illustrated in FIG. 1. The image processing unit 112 generates image data based on the pixel clock PCLK.

The modulation data generating unit 113 generates modulation data from the image data inputted from the image processing unit 112, based on the pixel clock PCLK. The modulation data is transmitted to the laser driving unit 114, which drives the semiconductor laser 101 according to the modulation data.

Figure 2:
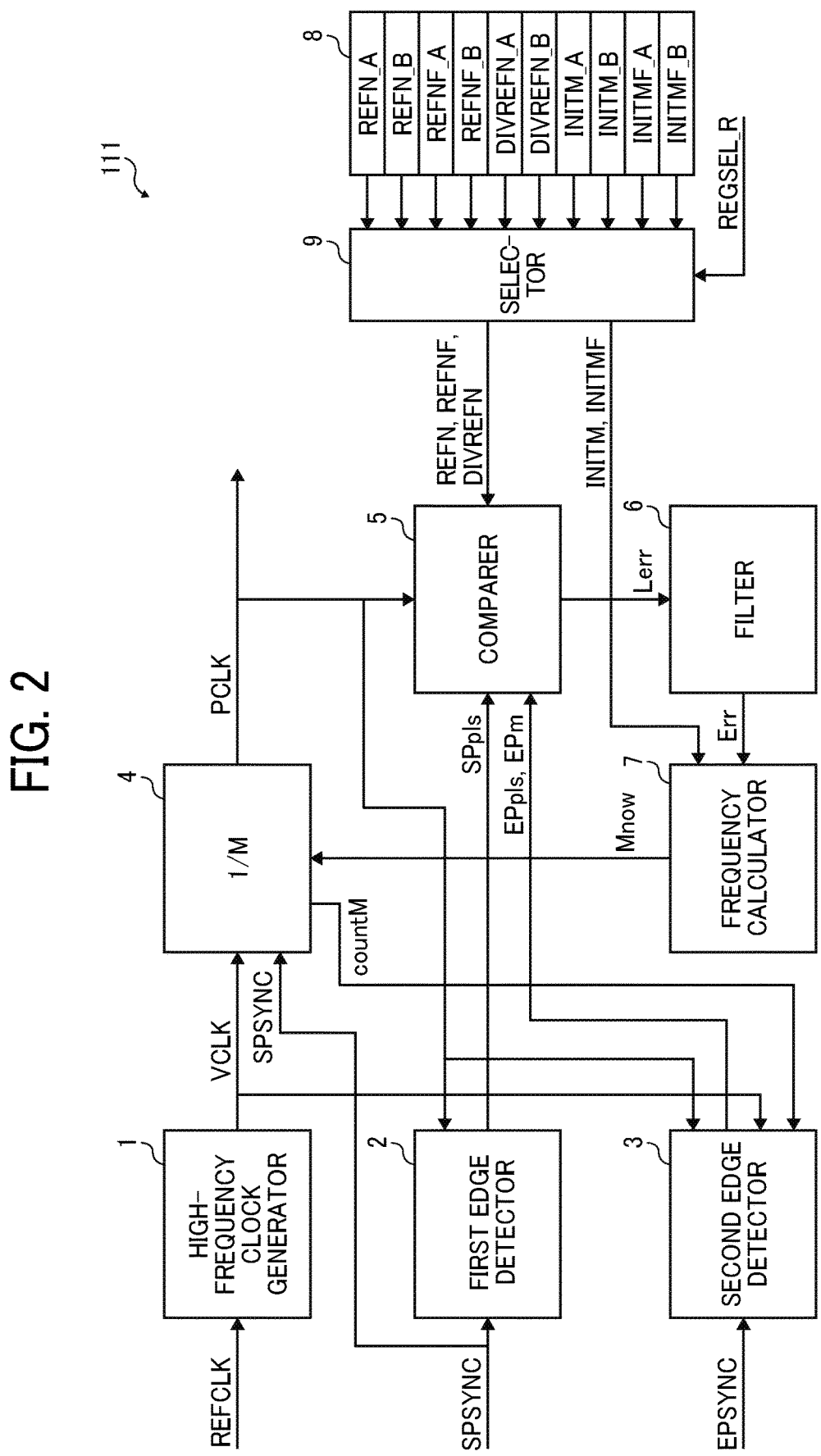
FIG. 2 is a functional block diagram of a pixel clock generating unit incorporated in the image writing device of FIG. 1.

Referring now to FIG. 2, a detailed description is given of the pixel clock generating unit 111 incorporated in the image writing device 100 described above.

FIG. 2 is a functional block diagram of the pixel clock generating unit 111.

The pixel clock generating unit 111 includes a high-frequency clock generator 1, a first edge detector 2, a second edge detector 3, a frequency divider (1/M) 4 serving as a pixel clock generator, a comparer 5, a filter 6, a frequency calculator 7 serving as a pixel clock generator, a pixel clock generation related register 8, and a selector 9 serving as a value switcher.

The high-frequency clock generator 1 multiplies a reference clock REFCLK inputted thereto, so as to generate a high-frequency clock VCLK. The high-frequency clock generator 1 is a general phase locked loop (PLL) circuit. The high-frequency clock generator 1 generates an accurate high-frequency clock VCLK from the reference clock REFCLK with, e.g., an accurate crystal oscillator. The high-frequency clock VCLK thus generated is transmitted to the frequency divider (1/M) 4, which generates the pixel clock PCLK based on the high-frequency clock VCLK.

Specifically, the frequency divider (1/M) 4 divides a frequency of the high-frequency clock VCLK by M, thus generating the pixel clock PCLK. The frequency divider (1/M) 4 includes, e.g., an M-ary counter that outputs a count value countM. If the counter starts counting when the leading-end synchronizing signal SPSYNC rises, a pixel clock can be generated having a phase synchronization with a scanning starting time. A frequency division ratio M is changed according to a pixel clock frequency instruction signal Mnow from the frequency calculator 7. Thus, the pixel clock PCLK is generated by dividing the high-frequency clock VCLK oscillated stably and accurately. Therefore, changing the frequency division ratio M instantly and stably changes a pixel clock frequency.

The first edge detector 2 detects a rising edge of the leading-end synchronizing signal SPSYNC based on the high-frequency clock VCLK. When detecting a rise of the leading-end synchronizing signal SPSYNC, the first edge detector 2 outputs a detection pulse SPpls synchronized with the pixel clock PCLK.

The second edge detector 3 detects a rising edge of the trailing-end synchronizing signal EPSYNC based on the high-frequency clock VCLK, and outputs a detection pulse EPpls and a count value EPm.

The comparer 5 detects a time Tline between the leading-end synchronizing signal SPSYNC and the trailing-end synchronizing signal EPSYNC. Then, the comparer 5 calculates an error of the line, herein referred to as a line error Lerr. The line error Lerr is a difference between the time Tline and a reference time that is predetermined according to a write frequency and a distance between the first photodetector (PD1) 108 and the second photodetector (PD2) 109. That is, an error of scanning speed is a difference between an appropriate scanning time (i.e., reference time) and a scanning time (i.e., time Tline) of the line.

The line error Lerr may be counted and calculated based on the high-frequency clock VCLK. However, the high-frequency clock VCLK has an extremely high frequency with an extremely large number of bits counted, which is disadvantageous in view of circuit size and power consumption. To address this circumstance, in the present embodiment, the time Tline is counted based on the pixel clock PCLK and compared to a reference value or reference count value REFN, to be converted as the line error Lerr that is based on the high-frequency clock.

The filter 6 is a digital filter that filters the line error Lerr and outputs error data Err. For example, the filter 6 simply averages errors of recent multiple lines (i.e., line errors Lerr) to obtain the error data Err.

The frequency calculator 7 calculates an appropriate pixel clock frequency according to the error data Err. Then, the frequency calculator 7 converts the pixel clock frequency into the pixel clock frequency instruction signal Mnow, and outputs the pixel clock frequency instruction signal Mnow. When scanning is performed with a pixel clock frequency satisfying a relation of Tp=KTv, where Tv represents a high-frequency clock cycle and Tp represents a pixel clock cycle, the error data Err is inputted into the frequency calculator 7 as a difference from a target value Tp' (Tp'=K'Tv). Since a relation of REFN·Tp'=REFN·Tp+Err·Tv is satisfied, if K' is set to satisfy a relation of K'=K+Err/REFN (Equation 1), the pixel clock frequency is controlled to be the target value.

At this time, the frequency calculator 7 uses a frequency instruction signal INITM inputted from outside. Specifically, the pixel clock generation related register 8 sets the frequency instruction signal INITM as an initial frequency instruction signal. The frequency instruction signal INITM is inputted into the frequency calculator 7 via the selector 9 as illustrated in FIG. 2. To generate an accurate image, a fractional part is designated as a frequency instruction signal (fractional part) INITMF. A detailed description of switching between register groups by the selector 9 is deferred.

Note that, preferably, the reference value REFN described above has a fractional part designated. In such a case, a reference value (fractional part) REFNF is inputted into the comparer 5 from outside. Since execution of division in a digital circuit may complicate the circuit, a reciprocal DIVREFN of the reference value REFN is calculated and inputted into the comparer 5 from outside in the present embodiment.

The frequency divider (1/M) 4, the comparer 5, the filter 6, and the frequency calculator 7 perform a digital PLL control. A characteristic of the filter 6 determines a characteristic of the PLL control. The characteristic of the filter 6 is determined to keep a control system stable. A loop gain may be changed with a relation of K'=K+α·Err/REFN.

The frequency division ratio M of the frequency divider (1/M) 4 is a natural number. Therefore, to reduce a rounding error and obtain a further accurate pixel clock, a value K of the pixel clock frequency is converted into the pixel clock frequency instruction signal Mnow as follows. For example, the rounding error is reduced by satisfying a relation of K=(M±1/C), where M represents an integer obtained by rounding the value K. If Mnow is equal to M (i.e., Mnow=M), the relation of K=(M±1/C) is satisfied when Mnow is equal to M+1 or M−1 (i.e., Mnow=M+1 or M−1) once in C cycles of the pixel clock. In addition, even distribution of rounded errors suppress localized deviation of the pixel clock. In such a case, the value M and the value C are controlled.

Referring now to FIGS. 3 through 8, configuration examples of the components described above.

Figure 3:
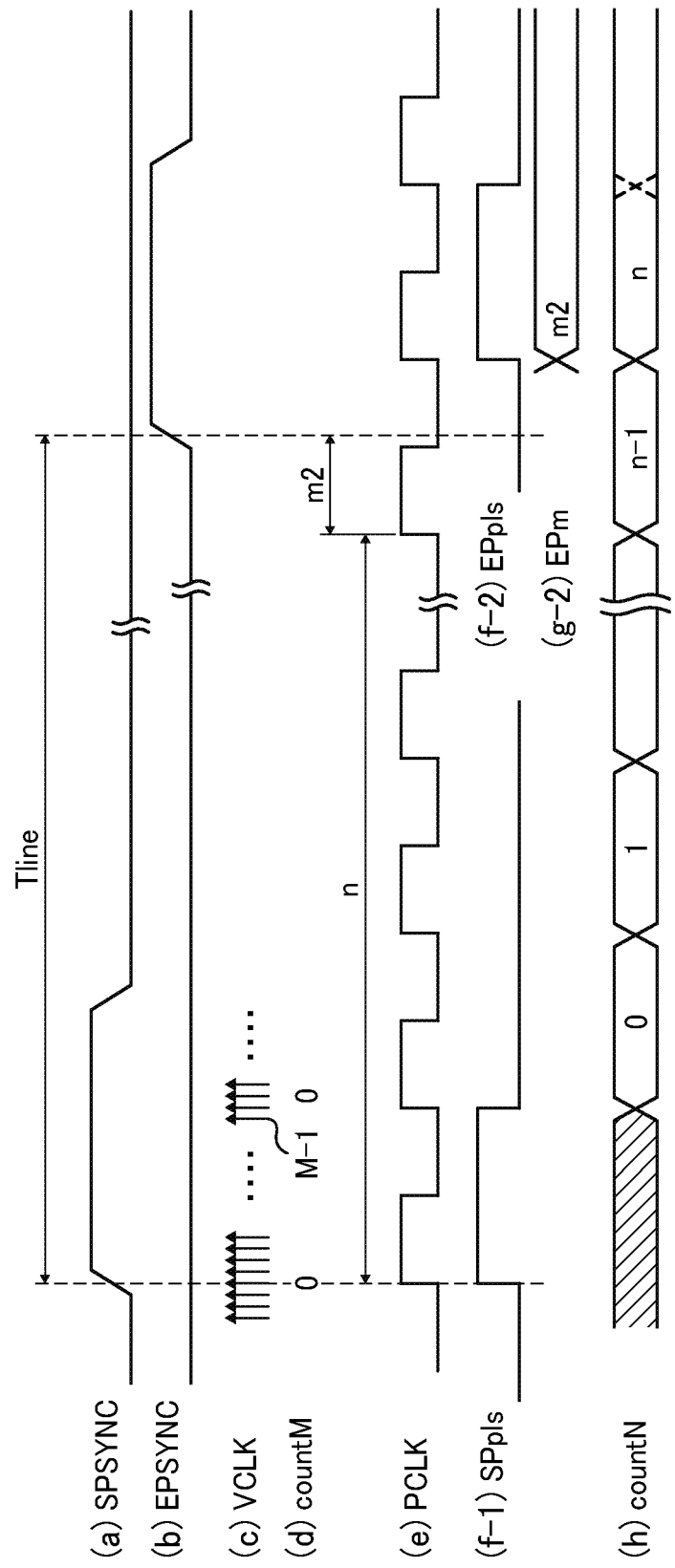
FIG. 3 is a timing chart of signals in the pixel clock generating unit of FIG. 2.
Figure 4:
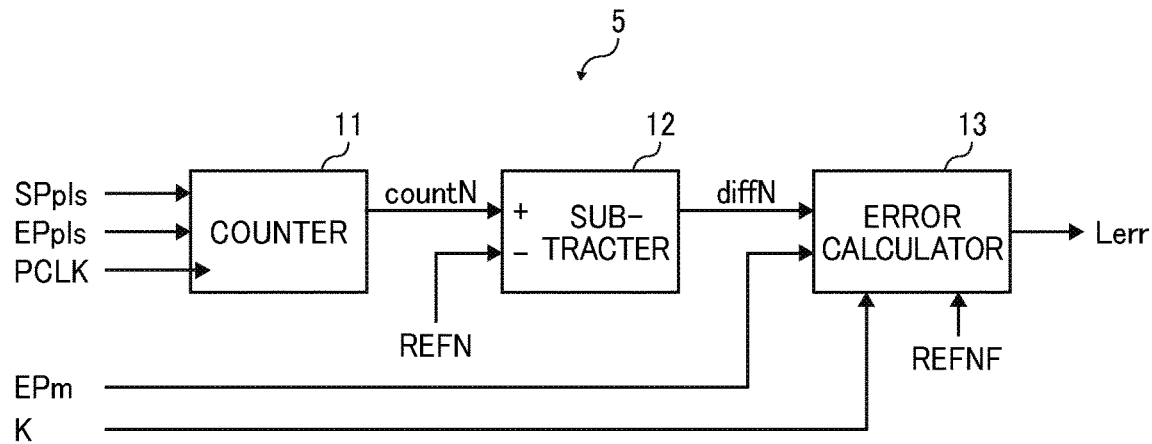
FIG. 4 is a functional block diagram of a comparer incorporated in the pixel clock generating unit.

Initially with reference to FIGS. 3 and 4, a detailed description of operation performed by the comparer 5.

FIG. 3 is a timing chart of signals in the pixel clock generating unit 111. FIG. 4 is a functional block diagram of the comparer 5.

In FIG. 3, (a) SPSYNC represents the leading-end synchronizing signal SPSYNC that indicates the start of scanning. The leading-end synchronizing signal SPSYNC is inputted into the first edge detector 2. (b) EPSYNC represents the trailing-end synchronizing signal EPSYNC that indicates the end of scanning. The trailing-end synchronizing signal EPSYNC is inputted into the second edge detector 3. (c) VCLK represents a rising edge of the high-frequency clock VCLK that is generated by the high-frequency clock generator 1.

(d) countM represents a count value that is counted by the frequency divider (1/M) 4 based on the high-frequency clock VCLK. (e) PCLK represents a pixel clock that rises when (d) countM is 0.

(f-1) SPpls is a pulse synchronized with the pixel clock PCLK, indicating a rise of the leading-end synchronizing signal SPSYNC (i.e., (a) SPSYNC). Similarly, (f-2) EPpls is a pulse synchronized with the pixel clock PCLK, indicating a rise of the trailing-end synchronizing signal EPSYNC (i.e., (b) EPSYNC). (g-2) EPm is a value of (d) countM when the trailing-end synchronizing signal EPSYNC (i.e., (b) EPSYNC) rises. (h) countN represents a value of the counter that counts based on the pixel clock PCLK in the comparer 5. (f-1) SPpls resets (h) countN to 0. (f-2) EPpls stops the counting.

As illustrated in FIG. 4, the comparer 5 includes a counter 11, a subtracter 12, and an error calculator 13. The counter 11 is a counter that counts based on the pixel clock PCLK. The pulse SPpls resets the value of the counter 11 (i.e., countN) to 0. The pulse EPpls stops the counting of the counter 11. The subtracter 12 subtracts the reference count value REFN from the value countN of the counter 11, which is "n" in FIG. 3, after the counter 11 stops counting. Then, the subtracter 12 outputs a subtraction result diffN. The error calculator 13 performs the following calculation to output the line error Lerr in units of the cycle Tv of the high-frequency clock VCLK:

$$Lerr = diffN \cdot K + EPm, \text{ where } diffN = n - REF_{N,EPm=m}2,$$
$$\text{and } Tp = K \cdot Tv,$$

where Tp represents the cycle of the pixel clock PCLK.

If the distance between the first photodetector (PD1) 108 and the second photodetector (PD2) 109 is not an integral multiple of a dot width, in other words, if the reference time is not an integral multiple of a target pixel clock cycle, the fraction is converted into the number of cycles of the high-frequency clock VCLK and inputted into the error calculator 13 as the reference value (fractional part) REFNF. The error calculator 13 calculates an equation of Lerr=diffN·K+EPm−REFNF. Accordingly, the pixel clock frequency can be controlled with enhanced accuracy.

Figure 5:
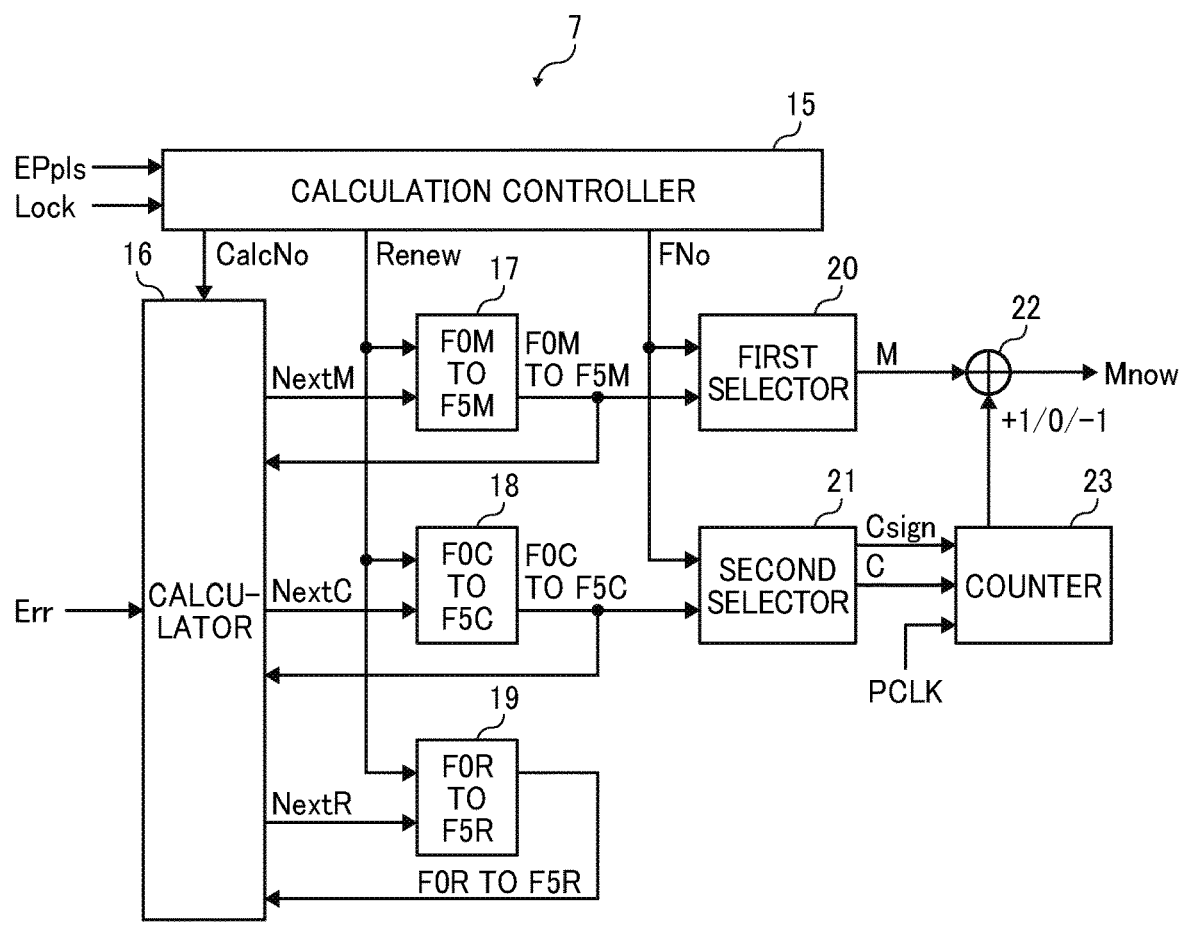
FIG. 5 is a functional block diagram of a frequency calculator incorporated in the pixel clock generating unit.

FIG. 5 is a functional block diagram of the frequency calculator 7.

Note that the polygon mirror 104 has six faces. The pixel clock frequency is controlled for each of the six faces to correct an error of each of the six faces.

As illustrated in FIG. 5, the frequency calculator 7 includes a calculation controller 15, a calculator 16, a first register (F0M-F5M) 17, a second register (F0C-F5C) 18, a third register (F0R-F5R) 19, a first selector 20, a second selector 21, an adder 22, and a counter 23.

The calculator 16 calculates next values NextM, NextC, and NextR from current values M, C, and R and the error data Err. The calculator 16 performs such calculation for each of the six faces of the polygon mirror 104 according to a calculation face instruction signal CalcNo. A relation of the values M, C, and R is Tp=(M±1/C) Tv, where C=REFN/R. From these equations and Equation 1 described above, relations of M'+R'/Nr=M+R/Nr+Err/Nr, and C'=Nr/R' are satisfied, where M' represents the next value NextM, R' represents the next value NextR, and Nr represents the reference count value REFN. Accordingly, the calculator 16 performs calculation according to a procedure below.

(1) The calculator 16 calculates R+Err (=TmpR).

(2) If TmpR is greater than Nr/2 (i.e., TmpR>Nr/2), R' is equal to TmpR−Nr (i.e., R'=TmpR−Nr) with M'=M+1. If TmpR is less than −Nr/2 (i.e., TmpR<−Nr/2), R' is equal to TmpR+Nr (i.e., R'=TmpR+Nr) with M'=M−1. In other cases, M' is equal to M (i.e., M'=M) while R' is equal to TmpR (i.e., R'=Tmp).

(3) C' is a quotient of Nr÷R'. Note that if R' is equal to 0 (i.e., R'=0), C' is equal to 0 (i.e., C'=0).

The first register (F0M-F5M) 17 is a data storage that retains the value M obtained by the calculation described above. The value M retained by the first register (F0M-F5M) 17 includes values F0M through F5M for the respective six faces of the polygon mirror 104. According to a renewal signal Renew, the first register (F0M-F5M) 17 renews the corresponding register value to the next value NextM. Note that numbers 0 through 5, each being interposed between "F" and "M" of the values F0M through F5M, indicate face numbers assigned to the six faces of the polygon mirror 104. Similarly, numbers 0 through 5, each being interposed between "F" and "M" of values F0C through F5C and values F0R-F5R described below indicate face numbers assigned to the six faces of the polygon mirror 104. In short, each of the six faces of the polygon mirror 104 has its own face number. Each of F0 through F5 indicates a value corresponding to the face number of the polygon mirror 104. Note that the face numbers indicate a relative relationship. The corresponding values are automatically controlled. Therefore, the face numbers do not necessarily coincide with actual faces.

Similar to the first register (F0M-F5M) 17, the second register (F0C-F5C) 18 is a data storage that retains the current value C. The current value C includes the values F0C through F5C for the respective six faces of the polygon mirror 104. According to the renewal signal Renew, the second register (F0C-F5C) renews the corresponding register value to the next value NextC. Similarly, the third register (F0R-F5R) 19 is a data storage that retains the current value R. The current value R includes the values F0R-F5R for the respective six faces of the polygon mirror 104. According to the renewal signal Renew, the third register (F0R-F5R) 19 renews the corresponding register value to the next value NextR.

According to a face selection signal FNo, the first selector 20 selects and outputs the corresponding value M out of the values F0M through F5M. Similarly, according to the face selection signal FNo, the second selector 21 selects and outputs the corresponding value C out of the values F0C through F5C. Note that Csign illustrated in FIG. 5 represents a sign of the value C.

The counter 23 counts the value C based on the pixel clock PCLK. The value C counted by the counter 23 includes values 0 through C−1. When the count value becomes C−1, the counter 23 outputs "+1" if Csign indicates a plus. By contrast, if Csign indicates a minus, the counter 23 outputs "−1". In other cases, the counter 23 outputs "0". Note that the counter 23 outputs "0" if C is equal to 0 (i.e., C=0).

The adder 22 adds the value M outputted by the first selector 20 and a value outputted by the counter 23. The adder 22 outputs the total amount of those quantities combined as the pixel clock frequency instruction signal Mnow. Thus, the value M is converted into M+1 or M−1 once in the C cycles of the pixel clock PCLK. That is, an average cycle of the pixel clock is (M±1/C) Tv.

The calculation controller 15 controls the calculation described above. The calculation controller 15 generates and outputs the calculation face instruction signal CalcNo, the renewal signal Renew, and the face selection signal FNo.

Figure 6:
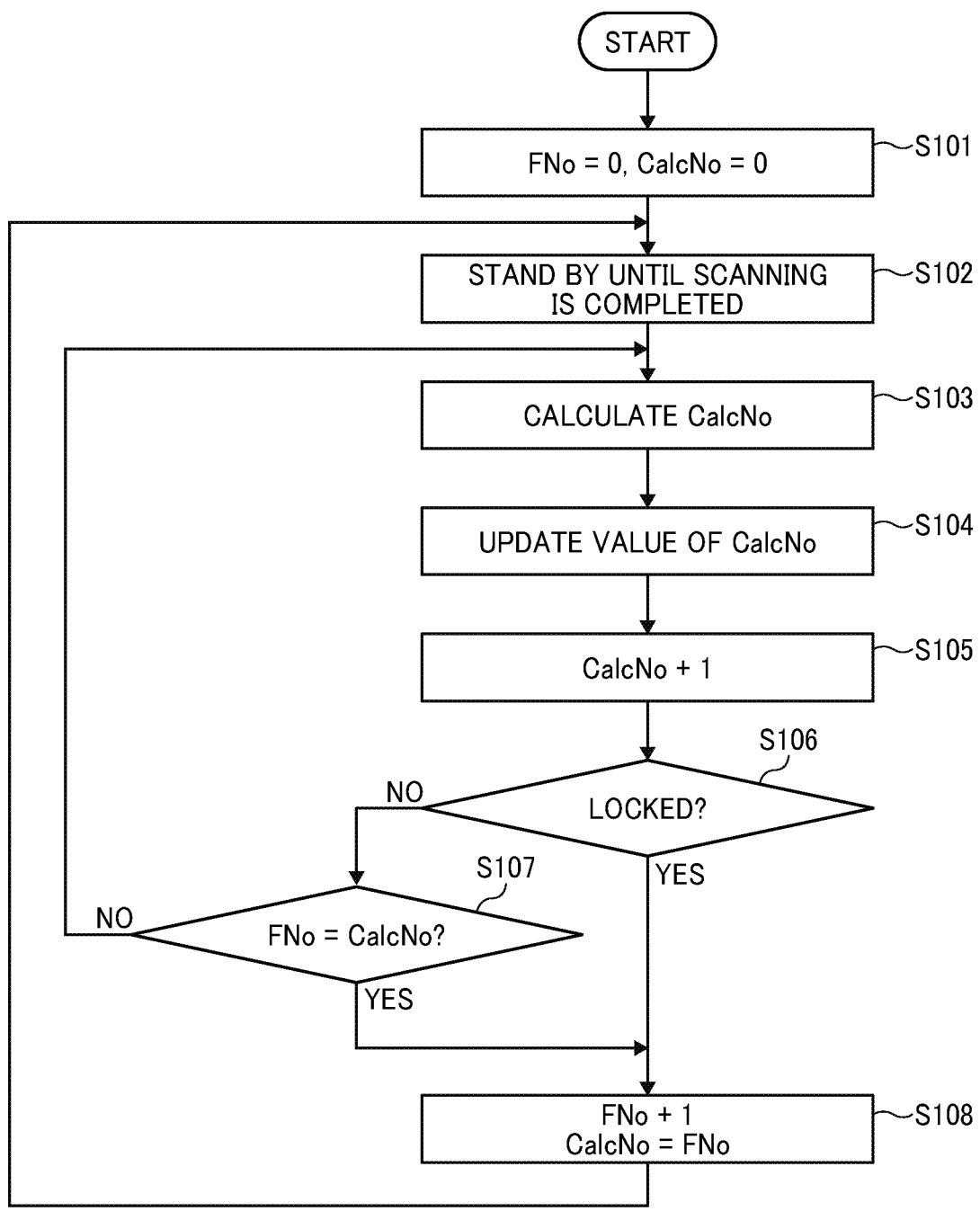
FIG. 6 is a flowchart illustrating a procedure taken by a calculation controller to output signals.

Referring now to FIG. 6, a description is given of a procedure taken by the calculation controller 15 to output these signals.

FIG. 6 is a flowchart illustrating the procedure taken by the calculation controller 15 to output the signals.

In step S101, the calculation controller 15 initializes the face selection signal FNo and the calculation face instruction signal CalcNo to 0 (i.e., Fno=0, CalcNo=0). In step S102, the calculation controller 15 stands by until scanning of one line is completed. In other words, the calculation controller 15 stands by until the calculation controller 15 detects completion of the scanning with the detection pulse EPpls. Note that a stand-by time, during which the calculation controller 15 stands by, includes a grace period before the calculation of the error data Err is settled.

In step S103, the calculation controller 15 controls the calculation described above corresponding to the current calculation face instruction signal CalcNo. In step S104, the calculation controller 15 activates the renewal signal Renew corresponding to the current calculation face instruction signal CalcNo such that the first register (F0M-F5M) 17, the second register (F0C-F5C) 18, and the third register (F0R-F5R) 19 renew the register values to the next values NextM, NextC, and NextR, respectively. In step S105, the calculation controller 15 performs increment of the calculation face instruction signal CalcNo. However, if the calculation face instruction signal CalcNo is 5 (i.e., CalcNo=5), the calculation face instruction signal CalcNo returns to 0.

In step S106, the process diverges according to a lock flag Lock that indicates whether the pixel clock frequency control is locked or not. Note that the lock flag Lock is a signal, hereinafter referred to as a lock signal, to regard that the pixel clock frequency control is locked if, for example, the line errors Lerr of predetermined lines (e.g., six lines) or the error data Err is within a predetermined range (e.g., ±2M). The predetermined range is determined by, e.g., a range of variations in errors between the faces or a desired control accuracy. The filter 6 may include a generator that generates the lock signal, for example. Alternatively, the lock signal may be activated when a predetermined time elapses from the start of control. The predetermined time is determined by, e.g., the number of lines, taking into account the control responsiveness.

If the calculation controller 15 determines that the pixel clock frequency control is locked (YES in step S106), then the process goes to step S108.

By contrast, if the calculation controller 15 determines that the pixel clock frequency control is not locked (NO in step S106), then the calculation controller 15 determines whether the calculation is performed and the value is renewed for each of the six faces of the polygon mirror 104 in step S107. If the calculation is performed for each of the six faces of the polygon mirror 104 (YES in step S107), the face selection signal FNo is equal to the calculation face instruction signal CalcNo (i.e., FNo=CalcNo). Then, the process goes to step S108. By contrast, if the calculation is not performed for each of the six faces of the polygon mirror 104 (NO in step S107), the process returns to step S103 to control the calculation for the remaining face or faces of the polygon mirror 104.

In step S108, the calculation controller 15 performs increment of the face selection signal FNo to substitute the value of the face selection signal FNo after the increment for the calculation face instruction signal CalcNo. As described above, if the face selection signal FNo is 5, the face selection signal FNo returns to 0. Accordingly, the values M and C, which are converted into the pixel clock frequency instruction signal Mnow, are changed to values of the next line. The procedure described above is taken until scanning of the next line starts, that is, until the leading-end synchronizing signal SPSYNC is detected. Thereafter, the process returns to step S102, following the subsequent steps described above. Thus, the procedure is repeated.

The calculation controller 15 executes control as described above to reduce the error data Err for each of the six faces of the polygon mirror 104 such that the clock frequencies of the faces of the polygon mirror 104 are within a predetermined range of errors, thereby increasing an entraining speed. In addition, the calculation controller 15 executes control for each of the six faces of the polygon mirror 104 after the clock frequencies are within the predetermined range of errors, thereby reducing the errors between the faces of the polygon mirror 104. Thus, the clock frequency is accurately controlled.

Figure 7:
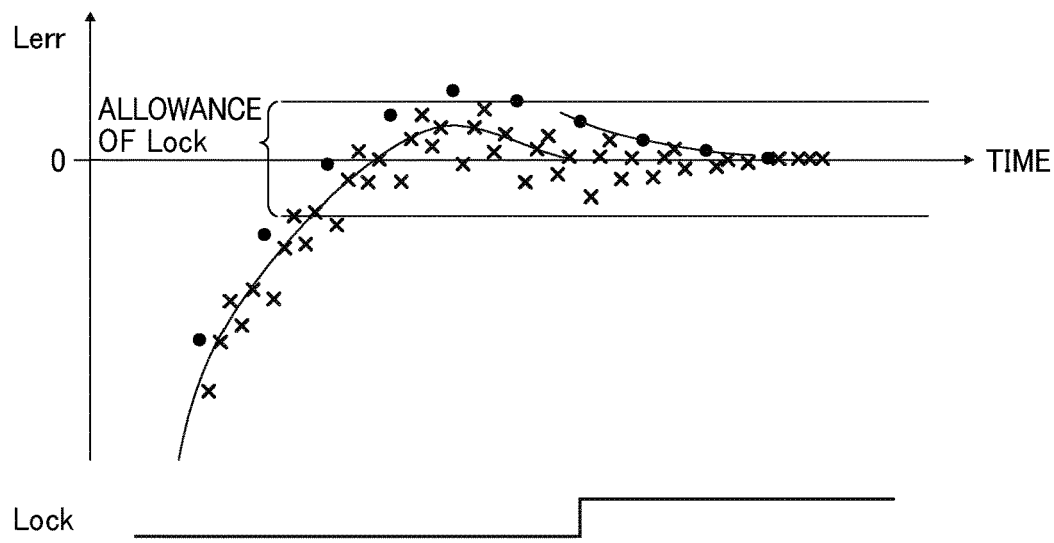
FIG. 7 is a graph illustrating a relationship between time and a line error.

Referring now to FIG. 7, a description is given of an entraining process.

FIG. 7 is a graph illustrating a relationship between time and the line error Lerr.

The horizontal axis indicates the time. The vertical axis indicates the line error Lerr. Dots indicate errors corresponding to the face number 0 of the polygon mirror 104. Cross marks indicate errors for the other faces of the polygon mirror 104. The broken line indicates an average value of the errors for the six faces of the polygon mirror 104.

Figure 8:
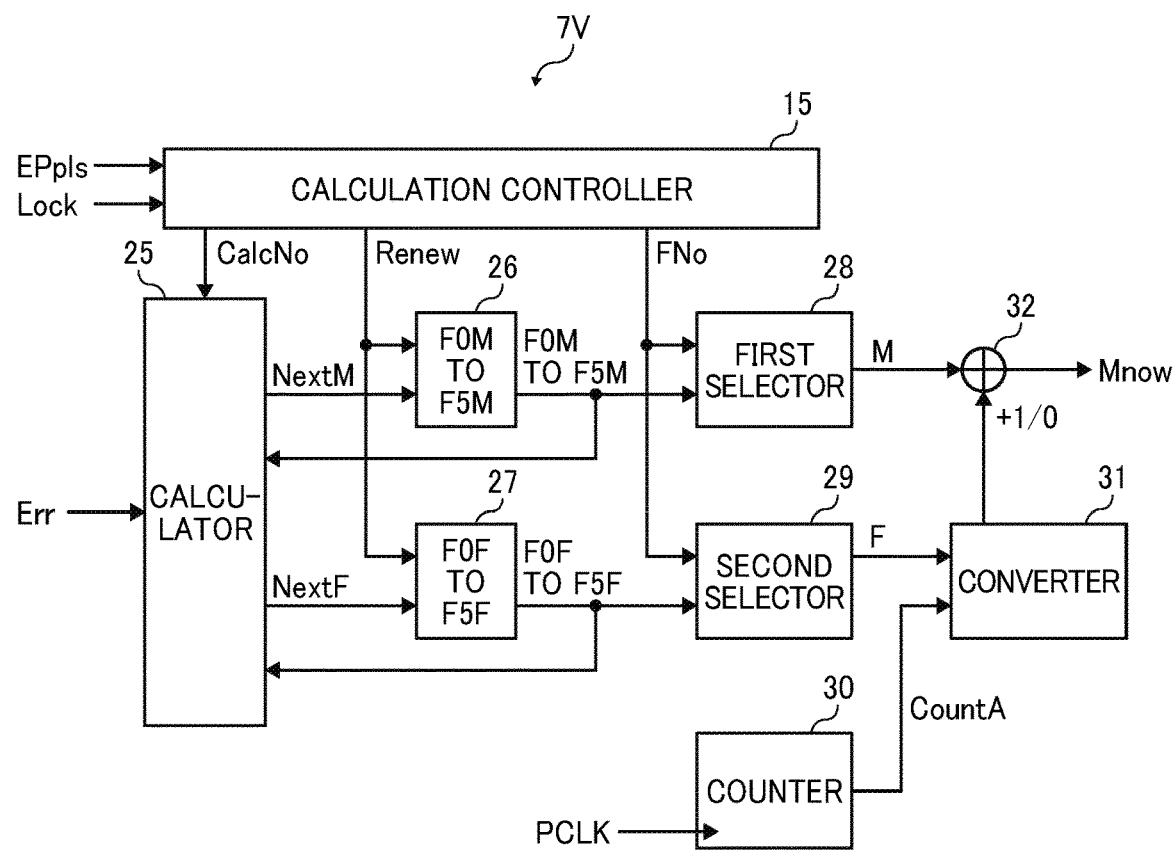
FIG. 8 is a functional block diagram of a variation of the frequency calculator of FIG. 5.

Referring now to FIG. 8, a description is given of a variation of the frequency calculator 7.

FIG. 8 is a functional block diagram of a frequency calculator 7V as a variation of the frequency calculator 7.

The frequency calculator 7V includes the calculation controller 15, a calculator 25, a first register (F0M-F5M) 26, a second register (F0F-F5F) 27, a first selector 28, a second selector 29, a counter 30, a converter 31, and an adder 32. Similar to the calculation controller 15 of the frequency calculator 7 illustrated in FIG. 5, the calculation controller 15 of the frequency calculator 7V illustrated in FIG. 8 controls calculation in the frequency calculator 7V. The calculator 25 calculates next values NextM and NextF from current values M and F and the error data Err. The calculator 25 performs such calculation for each of the six faces of the polygon mirror 104 according to the calculation face instruction signal CalcNo.

In the frequency calculator 7V, the value K of the pixel clock frequency is converted into the pixel clock frequency instruction signal Mnow as follows. Firstly, M represents an integer part of the value K. On the other hand, a fractional part of the value K is rounded to be a-digit number or value F expressed in the binary numeral system. A relation of K=(M+F/Na) is satisfied when Mnow is equal to M+1 (i.e., Mnow=M+1) F times in 2^a (=Na) cycles. Since the rounding error is at maximum Nref/Na, the number of digits (i.e., "a") of the fractional part is determined such that the error is within a desired allowance. To prevent localized frequency deviation, F-time cycles to add one are evenly distributed. The converter 31 bears such a function. From Equation 1 and the relation of K=(M+F/Na), a relation of K'+F'/Na=M+F/Na+Err/Nr is satisfied, where F' represents the next value NextF. Accordingly, the calculator 25 performs calculation according to a procedure below.

(1) The calculator 25 calculates F+Err/Nr*Na (=TmpF). Since Na is 2^a, *Na takes the higher "a" bits of the multiplicand (i.e., Err/Nr). In addition, since Nr is fixed during this frequency control, multiplying a reciprocal of Nr calculated in advance by the error data Err facilitates the calculation.

(2) If TmpF is greater than Na (i.e., TmpF>Na), M' is equal to M+1 (i.e., M'=M+1) and F' is equal to TmpF−Na (i.e., F'=TmpF−Na). If TmpF is less than 0 (i.e., TmpF<0), M' is equal to M−1 (i.e., M'=M−1) and F' is equal to TmpF+Na (i.e., F'=TmpF+Na).

Similar to the first register (F0M-F5M) 17 illustrated in FIG. 5, the first register (F0M-F5M) 26 is a data storage that retains the value M obtained by the calculation described above. The value M retained by the first register (F0M-F5M) 26 includes the values F0M through F5M for the respective six faces of the polygon mirror 104. According to the renewal signal Renew, the first register (F0M-F5M) 26 renews the corresponding register value to the next value NextM. Similarly, the second register (F0F-F5F) 27 is a data storage that retains the value F. The value F retained by the second register (F0F-F5F) 27 includes the values F0F through F5F for the respective six faces of the polygon mirror 104. According to the renewal signal Renew, the second register (F0F-F5F) 27 renews the corresponding register value to the next value NextF.

According to the face selection signal FNo, the first selector 28 selects and outputs the corresponding value M out of the values F0M through F5M. Similarly, according to the face selection signal FNo, the second selector 29 selects and outputs the corresponding value F out of the values F0F through F5F.

The counter 30 is an a-bit counter that counts based on the pixel clock PCLK. The counter 30 outputs a count value countA. According to the count value countA, the converter 31 outputs a signal UP indicating "1" for an F cycle or "0" for the remaining Na−F cycle of the Na (=2^a) cycles. The signal UP indicating "1" is generated F times evenly in the Na cycles when Arev is less than F (i.e., UP=(Arev<F)), where Arev represents a count value countA [0: a−1] produced by reversing the sequence of bits of the count value countA [a−1: 0].

The adder 32 adds the value M outputted by the first selector 28 and the signal UP outputted by the converter 31. The adder 32 outputs the total amount of those quantities combined as the pixel clock frequency instruction signal Mnow. Thus, the value M is converted into M+1 F times in the Na cycles of the pixel clock PCLK. That is, an average cycle of the pixel clock is (M+F/Na) Tv.

Figure 9:
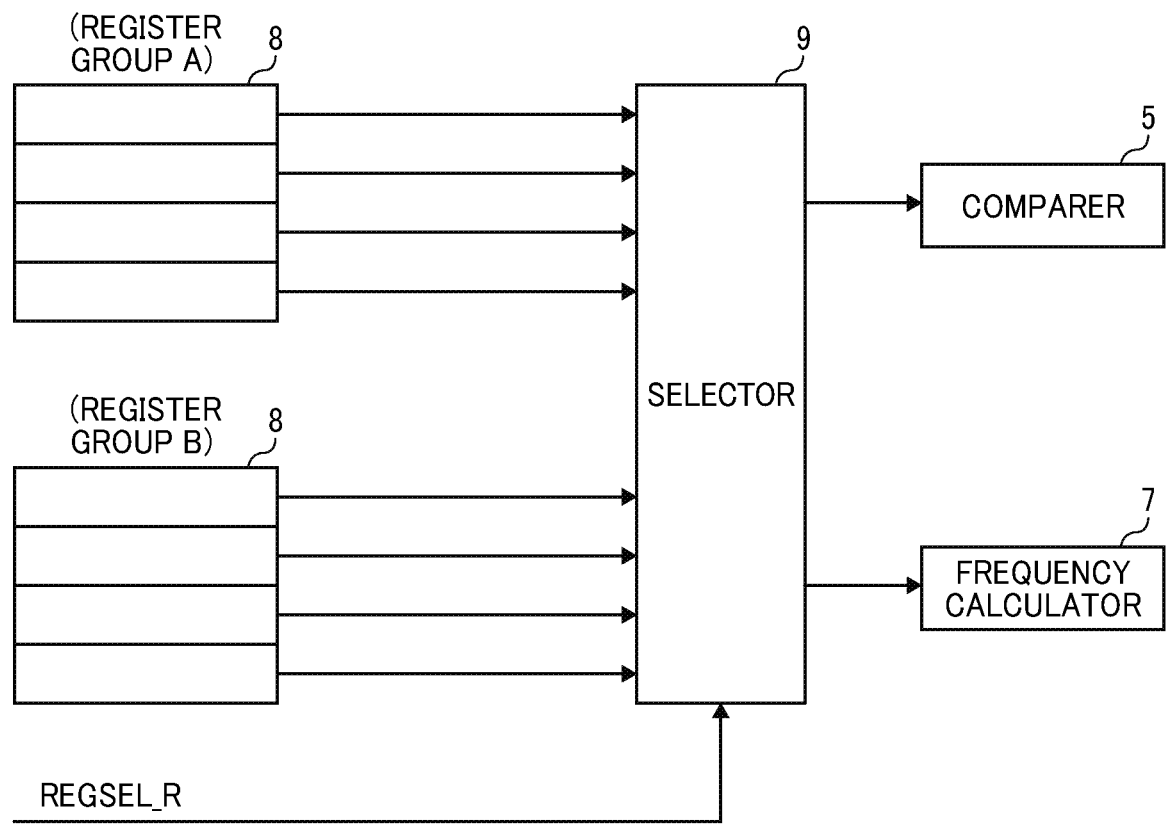
FIG. 9 is a partial functional block diagram of the pixel clock generating unit, specifically illustrating two groups of registers.

Referring now to FIG. 9, a description is given of switching between register groups.

FIG. 9 is a partial functional block diagram of the pixel clock generating unit 111, specifically illustrating two groups of registers.

When the image writing device 100 draws or scans one line, the pixel clock generating unit 111 generates a predetermined number of pixel clocks between the leading-end synchronizing signal SPSYNC and the trailing-end synchronizing signal EPSYNC. The modulation data generating unit 113 modulates the image data transmitted from the image processing unit 112 such that the image data has a pulse width. Then, the modulation data generating unit 113 outputs the image data thus modulated to the laser driving unit 114. As a consequence, an image is printed. At this time, the pixel clock PCLK has a cycle that is an integral multiple of the cycle of the high-frequency clock VCLK.

As described above, after an image for one sheet or page is printed, the resolution may be changed to print the next image. Typically, it is difficult to change the rotational speed of a polygon motor at this time while a time interval between the leading-end synchronizing signal SPSYNC and the trailing-end synchronizing signal EPSYNC remains unchanged. Therefore, to decrease the resolution, the speed of the pixel clock is lowered. On the other hand, to increase the resolution, the speed of the pixel clock is increased.

In the present embodiment, as illustrated in FIG. 9, the pixel clock generation related register 8 includes two groups of registers, namely, a register group A and a register group B, to change the pixel clock PCLK. According to a switching signal, herein referred to as a double register switching signal REGSEL, the register groups A and B are switched. Table 1 below is a configuration example of the register groups A and B. Preferably, the register groups A and B have identical configurations. In other words, the register groups according to the present embodiment are identically configured.

TABLE 1

REGISTER GROUP

| | |
|---|---|
| INIT_M | PIXEL CLOCK WIDTH (INTEGER PART) |
| INIT_MF | PIXEL CLOCK WIDTH (FRACTIONAL PART) |
| REF_N | TARGET PIXEL NUMBER (INTEGER PART) |
| REF_NF | TARGET PIXEL NUMBER (FRACTIONAL PART) |
| DIV_REFN | TARGET PIXEL NUMBER (RECIPROCAL) |
| SPOFS | LEADING-END OFFSET |

To change the pixel clock PCLK, as illustrated in Table 1, each of the register groups A and B includes, e.g., INIT_M, INIT_MF, REF_N, REF_NF, DIV_REFN, and SPOFS. Specifically, INIT_M represents a pixel clock width M by which the frequency of the high-frequency clock VCLK is divided to generate the pixel clock PCLK. INIT_MF represents a pixel clock width (fractional part) MF to retain the fractional part. REF_N represents a target pixel number (integer part), which is the reference value REFN that indicates the number of pixel clocks between the leading-end synchronizing signal SPSYNC and the trailing-end synchronizing signal EPSYNC. REF_NF represents a target pixel number (fractional part) REFNF to retain the fractional part. DIV_REFN represents a target pixel number (reciprocal), which is the reciprocal of REFN (i.e., 1/REFN) used instead of division in pixel clock correcting calculation. SPOFS represents a leading-end offset.

Referring now to FIG. 10, a detailed description is given of control to switch between the register groups A and B according to the double register switching signal REGSEL.

FIG. 10 is a timing chart illustrating a clock CLK, the leading-end synchronizing signal SPSYNC and the trailing-end synchronizing signal EPSYNC that are inputted into the pixel clock generating unit 111, the double register switching signal REGSEL, and a time during which pixel clock correcting calculation is performed.

The double register switching signal REGSEL is inputted after the pixel clock correcting calculation is completed and before the next leading-end synchronizing signal SPSYNC is inputted in the pixel clock generating unit 111. The pixel clock correcting calculation includes calculation of errors and correction of the pixel clock.

Specifically, in the pixel clock generating unit 111, the pixel clock correcting calculation is performed after the trailing-end synchronizing signal EPSYNC is inputted. The register groups A and B are switched according to the double register switching signal REGSEL after the pixel clock correcting calculation is completed and before the next leading-end synchronizing signal SPSYNC is inputted to prevent incorrect calculation.

That is, if the pixel clock is changed between a leading-end synchronization and a trailing-end synchronization in main scanning (i.e., between the leading-end synchronizing signal SPSYNC and the trailing-end synchronizing signal EPSYNC), the resolution is changed during one-line scanning. Since the pixel clock counted until the middle of one-line scanning is a pixel clock before setting change, the pixel clock correcting calculation may be inaccurately performed after the trailing-end synchronizing signal EPSYNC is inputted. Yet after the trailing-end synchronizing signal EPSYNC is inputted, if the reference value REFN is changed with respect to the number of pixel clocks measured, the pixel clock may inaccurately corrected. As a consequence, an incorrect pixel clock may be generated after a next synchronizing signal is inputted.

However, it has been typically difficult to switch between register groups after completion of the pixel clock correcting calculation and before an input of the next leading-end synchronizing signal SPSYNC. Therefore, typically, the register groups are switched after the leading-end synchronizing signal SPSYNC is inputted.

In the meantime, an engine control side (e.g., image processing unit 112) receives the leading-end synchronizing signal SPSYNC and sends out data for one line in synchronization with the pixel clock. That is, when a pixel clock generating unit (e.g., pixel clock generating unit 111) receives the trailing-end synchronizing signal EPSYNC, the engine control side does not execute particular processing.

Therefore, time measuring processing may be needed to wait for the pixel clock generating unit to receive the trailing-end synchronizing signal EPSYNC and to perform calculation to correct the clock frequency after receiving the trailing-end synchronizing signal EPSYNC. Such additional processing may complicate overall processing.

In addition, if the register groups are switched after receiving the leading-end synchronizing signal SPSYNC, the pixel clock and a target number of pixels are changed in the middle of one-line scanning. Such changes may cause significant errors in measurement of the leading-end synchronizing signal SPSYNC and the trailing-end synchronizing signal EPSYNC, producing an incorrect pixel clock after the register groups are switched.

To address these circumstances, according to the present embodiment, the pixel clock generating unit 111 switches between the register groups A and B related to the setting of the pixel clock, thereby accurately correcting the pixel clock.

Specifically, according to the present embodiment described above, a pixel clock generating device (e.g., pixel clock generating unit 111) includes a high-frequency clock generator (e.g., high-frequency clock generator 1), a comparer (e.g., comparer 5), a pixel clock generator (e.g., frequency calculator 7, frequency divider (1/M) 4), and a value switcher (e.g., selector 9, delay circuit 10). The high-frequency clock generator generates a high-frequency clock. The comparer measures a time interval between a leading-end synchronizing signal (e.g., leading-end synchronizing signal SPSYNC) and a trailing-end synchronizing signal (e.g., trailing-end synchronizing signal EPSYNC) in a main scanning, and calculates an error between the time interval and a target value. The pixel clock generator generates a pixel clock based on the high-frequency clock and a pixel clock frequency, and corrects the pixel clock based on the error. The value switcher includes a plurality of groups of values (e.g., register groups A and B) with which the pixel clock is generated. The value switcher switches between the plurality of groups of values according to a switching signal (e.g., double register switching signal REGSEL) after the trailing-end synchronizing signal is inputted, and after the comparer calculates the error and the pixel clock generator corrects the pixel clock.

Figure 12:
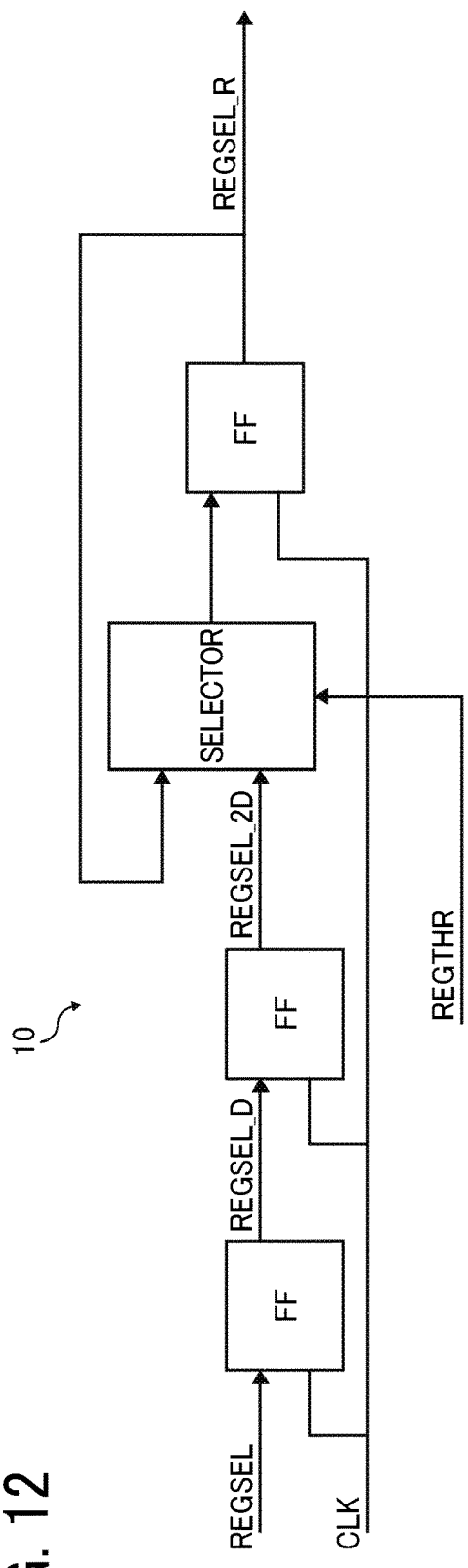
FIG. 12 is a block diagram of the delay circuit incorporated in the pixel clock generating unit.
Figure 13:
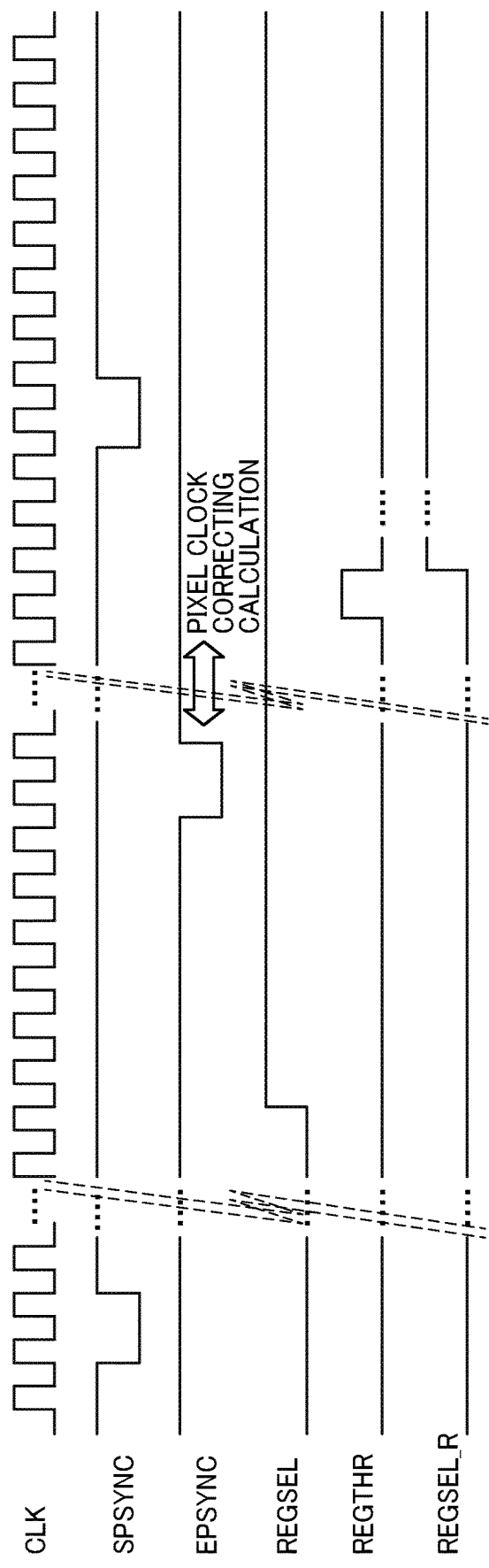
FIG. 13 is a timing chart illustrating the clock, the synchronizing signals, double register switching signals, a through signal, and the time during which the pixel clock correcting calculation is performed in the delay circuit of FIG. 12.

Referring now to FIGS. 11 through 13, a description is given of a delay circuit 10, serving as a value switcher, for the double register switching signal REGSEL.

FIG. 11 is a block diagram illustrating a delay circuit 10C as a comparative example of the delay circuit 10. FIG. 12 is a block diagram of the delay circuit 10 for the double register switching signal REGSEL incorporated in the pixel clock generating unit 111 according to the present embodiment. FIG. 13 is a timing chart illustrating the clock, the leading-end synchronizing signal SPSYNC, the trailing-end synchronizing signal EPSYNC, the double register switching signal REGSEL, a double register switching signal REGSEL_R, a through signal REGTHR, and the time during which the pixel clock correcting calculation is performed in the delay circuit 10 illustrated in FIG. 12.

In the delay circuit 10C of FIG. 11, the double register switching signal is used directly to switch register groups. By contrast, in the delay circuit 10 of FIG. 12 according to the present embodiment, the pixel clock generating unit 111 generates the signal REGTHR, which is asserted after correction of the pixel clock is completed following trailing end synchronization. Based on the signal REGTHR, the double register switching signal REGSEL is retained. The register groups (i.e., register groups A and B) are switched according to the double register switching signal REGSEL_R after completion of the pixel clock correcting calculation and before an input of the next leading-end synchronizing signal SPSYNC, as illustrated in FIG. 13.

With the delay circuit 10 of FIG. 12, the pixel clock generating unit 111 receives the double register switching signal REGSEL_R after completion of delay calculation. That is, the pixel clock generating unit 111 incorporating the delay circuit 10 includes a sequencer that performs error clock calculation. From the time when the error calculation is completed, a through signal is asserted to feed through a signal on the engine control side.

Thus, the register groups are switched after the trailing-end synchronizing signal EPSYNC is inputted and immediately after the pixel clock correcting calculation to prevent the pixel clock from being switched in the middle of one line, thereby correctly and accurately performing the pixel clock correcting calculation with an assumed number of pixels, the number of pixel clocks between leading end synchronization and trailing end synchronization, and an assumed number of pixel clocks. Accordingly, the present embodiment attains reduction in a set number of registers due to conversion of resolution with double registers, together with processing of correcting the pixel clock for each line.

According to the present embodiment described above, the pixel clock generating device (e.g., pixel clock generating unit 111) includes a device (e.g., delay circuit 10 of FIG. 12) to temporarily latch the double register switching signal inputted at any time and feed through the signal at or after the time when the pixel clock correcting calculation is completed. Accordingly, the pixel clock generating device accurately corrects the pixel clock. In other words, instead of using the double register switching signal to simply switch the register groups, the pixel clock generating device of the present embodiment latches the switching signal in a section where a switching permission signal from a pixel clock correction block is asserted, so as to correct the pixel clock according to the switching signal latched in actuality. Accordingly, the pixel clock generating device correctly switches the pixel clock while accurately correcting the pixel clock.

Thus, a double register function is applied to the pixel clock generating device having a function to correct the frequency for each line based on a difference between an assumed value of a time interval between the leading end and the trailing end of a line and a value measured based on an actual scanning speed. Accordingly, even under different printing conditions, such as changes in resolution due to changes in printing modes, the pixel clock generating device of the present embodiment instantly changes the setting by simply changing a register switching signal, and executes printing of the next line with a new setting while maintaining effective pixel clock correction.

Figure 14:
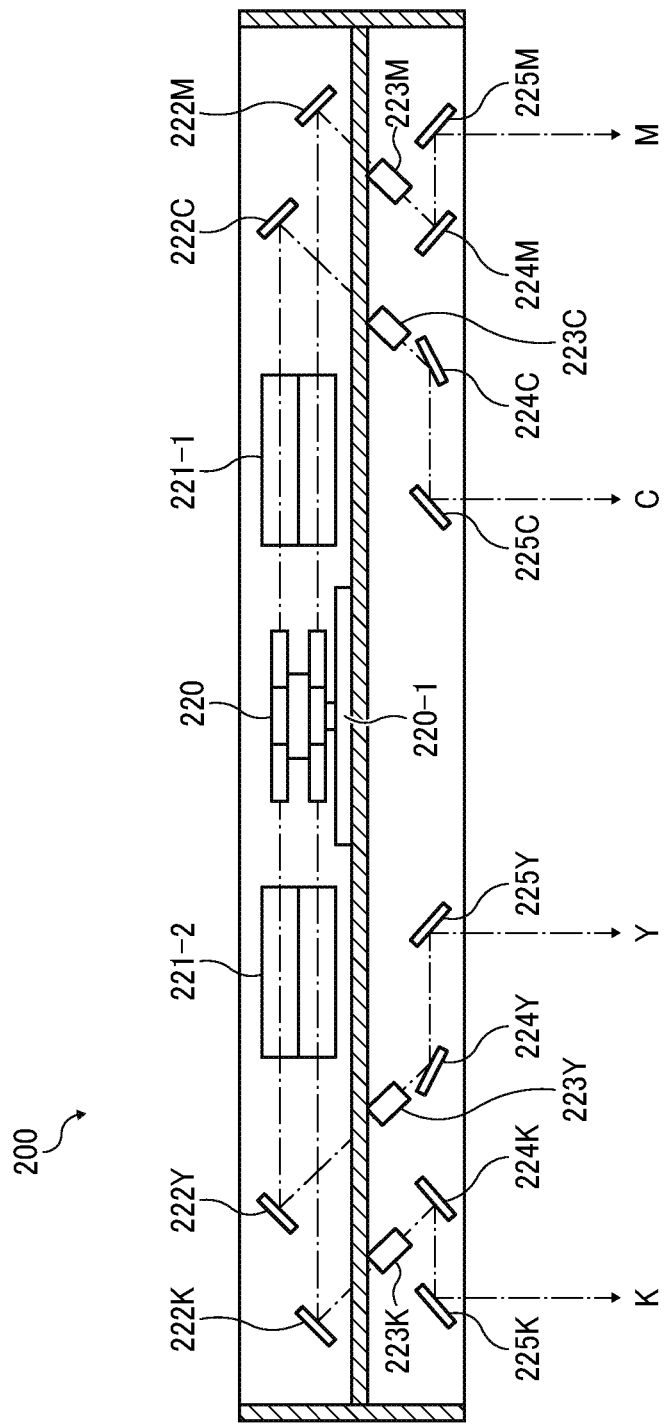
FIG. 14 is a schematic view of an image writing device incorporated in a color image forming apparatus according to an embodiment of the present disclosure.
Figure 15:
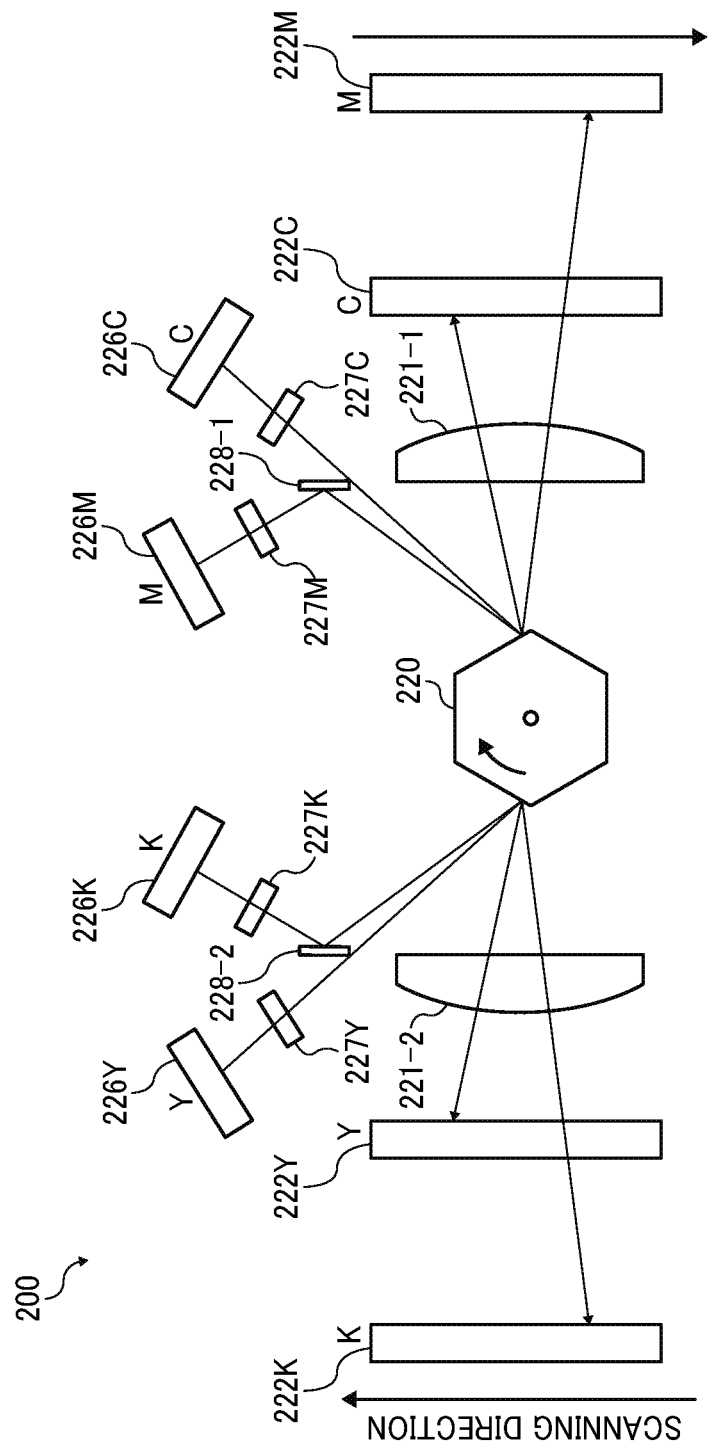
FIG. 15 is a top view of the image writing device of FIG. 14, illustrating a writing structure.

Referring now to FIGS. 14 and 15, a description is given of an image writing device 200 incorporated in an image forming apparatus 1000 according to an embodiment of the present disclosure.

FIG. 14 is a schematic view of the image writing device 200 incorporated in the image forming apparatus 1000, which is a color image forming apparatus in the present embodiment. FIG. 15 is a top view of the image writing device 200, illustrating a writing structure.

As illustrated in FIG. 14, the image writing device 200 includes, e.g., a polygon motor 220-1, a polygon mirror 220, f-θ lenses 221-1 and 221-2, first mirrors 222K, 222Y, 222C, and 222M, wide toroidal lenses (WTLs) 223K, 223Y, 223C, and 223M, second mirrors 224K, 224Y, 224C, and 224M, and third mirrors 225K, 225Y, 225C, and 225M. The polygon motor 220-1 drives and rotates the polygon mirror 220.

The image writing device 200 writes image data of four colors, namely, black (K), yellow (Y), cyan (C), and magenta (M). That is, the single image writing device 200 writes images of four colors. Specifically, as illustrated in FIG. 15, the image writing device 200 includes four laser units 226K, 226Y, 226C, and 226M for black, yellow, cyan, and magenta, respectively. The laser units 226K, 226Y, 226C, and 226M, serving as laser devices, include laser diodes that emit laser beams. The laser beams from the laser units 226K, 226Y, 226C, and 226M strike cylindrical lenses 227K, 227Y, 227C, and 227M, respectively. The cylindrical lenses 227K, 227Y, 227C, and 227M have a refractive index fixed in a sub-scanning direction. The cylindrical lenses 227K, 227Y, 227C, and 227M condense the laser beams emitted from the laser units 226K, 226Y, 226C, and 226M, respectively, in the sub-scanning direction. Thus, each of the cylindrical lenses 227K, 227Y, 227C, and 227M forms a condensed laser beam. The condensed laser beam strikes a mirror face of the polygon mirror 220. The polygon mirror 220 rotated by the polygon motor 220-1 at high speed deflects the incident laser beams in a main scanning direction. Thus, the polygon mirror 220 serves as a deflector.

In the image writing device 200, the polygon motor 220-1 is centrally disposed in a writing optical unit. The polygon motor 220-1 rotates the single polygon mirror 220 having two stories to deflect the laser beams in the main scanning direction. With the laser beams, the image writing device 200 writes images of four colors. As illustrated in FIGS. 14 and 15, the image writing device 200 includes symmetrical components about the polygon mirror 220. Specifically, the laser units 226M and 226K are disposed symmetrically about the polygon mirror 220. Similarly, the laser units 226C and 226Y are disposed symmetrically about the polygon mirror 220. Mirrors 228-1 and 228-2 are disposed symmetrically about the polygon mirror 220. The first mirrors 222M and 222K are disposed symmetrically about the polygon mirror 220. Similarly, the first mirrors 222C and 222Y are disposed symmetrically about the polygon mirror 220. The second mirrors 224M and 224K are disposed symmetrically about the polygon mirror 220. Similarly, the second mirrors 224C and 224Y are disposed symmetrically about the polygon mirror 220. The third mirrors 225M and 225K are disposed symmetrically about the polygon mirror 220. Similarly, the third mirrors 225C and 225Y are disposed symmetrically about the polygon mirror 220. The cylindrical lenses 227M and 227K are disposed symmetrically about the polygon mirror 220. Similarly, the cylindrical lenses 227C and 227Y are disposed symmetrically about the polygon mirror 220. The f-θ lenses 221-1 and 221-2 are disposed symmetrically about the polygon mirror 220. The WTLs 223M and 223K are disposed symmetrically about the polygon mirror 220. Similarly, the WTLs 223C and 223Y are disposed symmetrically about the polygon mirror 220. Thus, some components of the image writing device 200 define two optical paths for two colors on each of right and left sides. Accordingly, the single polygon mirror 220 deflects the laser beams for four colors. In the present example of FIGS. 14 and 15, an optical path K for black and an optical path Y for yellow are formed on the left side of the polygon mirror 220 whereas an optical path C for cyan and an optical path M for magenta are formed on the right side of the polygon mirror 220.

The first mirrors 222K, 222Y, 222C, and 222M reflect the laser beams deflected by the polygon mirror 220. The laser beams thus reflected from the first mirrors 222K, 222Y, 222C, and 222 strike the WTLs 223K, 223Y, 223C, and 223M, respectively. The laser beams passing through the WTLs 223K, 223Y, 223C, and 223M strike the second mirrors 224K, 224Y, 224C, and 224M, respectively. Note that the WTLs 223K, 223Y, 223C, and 223M correct optical face tangle error characteristics of the polygon mirror 220. The second mirrors 224K, 224Y, 224C, and 224M reflect the laser beams toward the third mirrors 225K, 225Y, 225C, and 225M, respectively, which also reflect the laser beams. Thus, the laser beams are emitted from the writing optical unit and imaged on photoconductive drums 202K, 202Y, 202C, and 202M, illustrated in FIG. 16, for black, yellow, cyan, and magenta, respectively.

Figure 16:
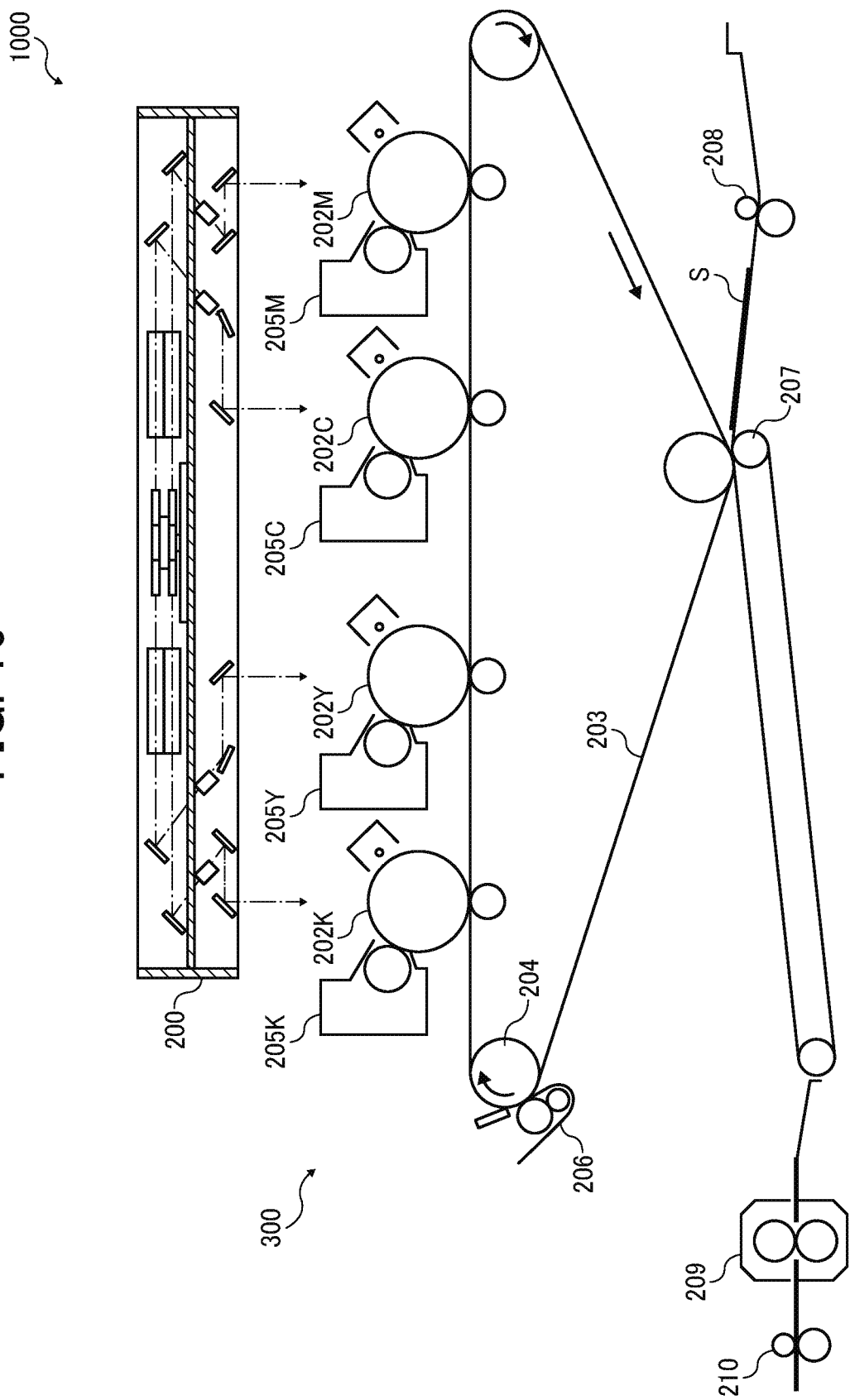
FIG. 16 is a schematic view of the color image forming apparatus, illustrating the image writing device and an image forming device.

Referring now to FIG. 16, a description is given of the image forming apparatus 1000 that forms a color image on a sheet S serving as a recording medium.

FIG. 16 is a schematic view of the image forming apparatus 1000, illustrating the image writing device 200 and an image forming device 300 to form an image.

The image forming apparatus 1000 may be a copier, a facsimile machine, a printer, a multifunction peripheral (MFP) having at least two of copying, printing, scanning, facsimile, and plotter functions, or the like. According to the present embodiment, the image forming apparatus 1000 is a color image forming apparatus that forms color and monochrome images on a recording medium by electrophotography. Alternatively, the image forming apparatus 1000 may be a monochrome image forming apparatus that forms a monochrome image on a recording medium.

In the present embodiment, as illustrated in FIG. 16, the image forming device 300 is disposed below the image writing device 200. The image forming device 300 includes the photoconductive drums 202K, 202Y, 202C, and 202M, an intermediate transfer belt 203, an intermediate transfer roller 204, developing devices 205K, 205Y, 205C, and 205M, an intermediate transfer belt cleaner 206, a transfer device 207, a sheet feeding registration roller pair 208, a fixing device 209, and an output device 210 as a sheet ejecting device.

Similar to the image writing device 200 of FIGS. 14 and 15 having a configuration to write images of four colors, the image forming apparatus 1000 of FIG. 16 has a configuration to form color images with four colors, namely, black, yellow, cyan, and magenta. Since the synchronizing signals depend on the four colors, the resolution is timed to be changed between consecutive recording media (e.g., sheets) for each color. That is, the pixel clock generating unit 111 for one color switches between the register groups (e.g., register groups A and B) according to a switching signal (e.g., double register switching signal) at a time different from a time when the pixel clock generating unit 111 for another color switches the register groups according to the switching signal.

The configuration of the pixel clock generating unit 111 described above is applied to the image writing device 200 of the image forming apparatus 1000 that forms a color image. That is, the image writing device 200 includes the pixel clock generating unit 111 for each of the four colors. A controller (i.e., central processing unit (CPU)) of the image forming apparatus 1000 outputs a double register switching instruction to the pixel clock generating unit 111 for each color. Accordingly, the image forming apparatus 1000 executes accurate correction of a writing pixel clock for each color.

According to the embodiments described above, the pixel clock generating device (e.g., pixel clock generating unit 111) switches between register groups related to setting of a pixel clock, thereby accurately correcting the pixel clock.

Although the present disclosure makes reference to specific embodiments, it is to be noted that the present disclosure is not limited to the details of the embodiments described above and various modifications and enhancements are possible without departing from the scope of the present disclosure. It is therefore to be understood that the present disclosure may be practiced otherwise than as specifically described herein. For example, elements and/or features of different embodiments may be combined with each other and/or substituted for each other within the scope of the present disclosure. The number of constituent elements and their locations, shapes, and so forth are not limited to any of the structure for performing the methodology illustrated in the drawings.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

Any one of the above-described operations may be performed in various other ways, for example, in an order different from the one described above.

Further, any of the above-described devices or units can be implemented as a hardware apparatus, such as a special-purpose circuit or device, or as a hardware/software combination, such as a processor executing a software program.

Further, as described above, any one of the above-described and other methods of the present disclosure may be embodied in the form of a computer program stored in any kind of storage medium. Examples of storage mediums include, but are not limited to, flexible disks, hard disks, optical discs, magneto-optical discs, magnetic tapes, non-volatile memory cards, read only memories (ROMs), etc.

Alternatively, any one of the above-described and other methods of the present disclosure may be implemented by an application specific integrated circuit (ASIC), prepared by interconnecting an appropriate network of conventional component circuits or by a combination thereof with one or more conventional general purpose microprocessors and/or signal processors programmed accordingly.

What is claimed is:

1. A pixel clock generating device comprising:
   a high-frequency clock generator configured to generate a high-frequency clock;
   a comparer configured to measure a time interval between a leading-end synchronizing signal and a trailing-end synchronizing signal in a main scanning and calculate an error between the time interval and a target value;
   a pixel clock generator configured to generate a pixel clock based on the high-frequency clock and a pixel clock frequency and correct the pixel clock based on the error; and
   a value switcher including a plurality of groups of values with which the pixel clock is generated, each of the plurality of groups of values associated with a-faces of a polygonal mirror, the polygonal mirror including at least three faces,
      the value switcher configured to switch between the plurality of groups of values according to a switching signal based on the trailing-end synchronizing signal being inputted, the comparer calculating the error, and the pixel clock generator correcting the pixel clock.

2. The pixel clock generating device according to claim 1, wherein the value switcher is configured to complete switching between the plurality of groups of values according to the switching signal before a next leading-end synchronizing signal is inputted.

3. The pixel clock generating device according to claim 1, wherein the value switcher is configured to:
   latch the switching signal inputted until the comparer completes calculating the error and the pixel clock generator completes correcting the pixel clock; and
   then output the switching signal.

4. The pixel clock generating device according to claim 1, wherein the plurality of groups of values is identically configured.

5. The pixel clock generating device according to claim 1, wherein the pixel clock generator is further configured to average a plurality of error values and correct the pixel clock based on the average of the plurality of error values.

6. The pixel clock generating device according to claim 1, wherein the pixel clock generator is further configured to set the pixel clock frequency based on the error and the target value.

7. An image writing device comprising:
   at least one semiconductor laser configured to form an electrostatic latent image on a photoconductor;
   a high-frequency clock generator configured to generate a high-frequency clock;
   a comparer configured to measure a time interval between a leading-end synchronizing signal and a trailing-end synchronizing signal in a main scanning and calculate an error between the time interval and a target value;
   a pixel clock generator configured to generate a pixel clock based on the high-frequency clock and a pixel clock frequency and correct the pixel clock based on the error; and
   a value switcher including a plurality of groups of values with which the pixel clock is generated, each of the plurality of groups of values associated with a-faces of a polygonal mirror, the polygonal mirror including at least three faces,
      the value switcher configured to switch between the plurality of groups of values according to a switching signal based on the trailing-end synchronizing signal being inputted, the comparer calculating the error, and the pixel clock generator correcting the pixel clock.

8. An image forming apparatus comprising the image writing device according to claim 7.

9. The image writing device according to claim 7, wherein the value switcher is configured to complete switching between the plurality of groups of values according to the switching signal before a next leading-end synchronizing signal is inputted.

10. The image writing device according to claim 7, wherein the value switcher is configured to:
   latch the switching signal inputted until the comparer completes calculating the error and the pixel clock generator completes correcting the pixel clock; and
   then output the switching signal.

11. The image writing device according to claim 7, wherein the plurality of groups of values is identically configured.

12. The image writing device according to claim 7, wherein the pixel clock generator is further configured to average a plurality of error values and correct the pixel clock based on the average of the plurality of error values.

13. The image writing device according to claim 7, wherein the pixel clock generator is further configured to set the pixel clock frequency based on the error and the target value.

14. An image writing device for writing images of a plurality of colors, the image writing device comprising a pixel clock generating device for each of the plurality of colors, the pixel clock generating device comprising:

a high-frequency clock generator configured to generate a high-frequency clock;

a comparer configured to measure a time interval between a leading-end synchronizing signal and a trailing-end synchronizing signal in a main scanning and calculate an error between the time interval and a target value;

a pixel clock generator configured to generate a pixel clock based on the high-frequency clock and a pixel clock frequency and correct the pixel clock based on the error; and a value switcher including a plurality of groups of values with which the pixel clock is generated, each of the plurality of groups of values associated with a-faces of a polygonal mirror, the polygonal mirror including at least three faces, the value switcher configured to switch between the plurality of groups of values according to a switching signal based on the trailing-end synchronizing signal being inputted, the comparer calculating the error, and the pixel clock generator correcting the pixel clock.

15. The image writing device according to claim 14, wherein the pixel clock generating device for each of the plurality of colors is configured to switch between the plurality of groups of values according to the switching signal at a time different from each other.

16. The image writing device according to claim 14, wherein the value switcher is configured to complete switching between the plurality of groups of values according to the switching signal before a next leading-end synchronizing signal is inputted.

17. The image writing device according to claim 14, wherein the value switcher is configured to:
latch the switching signal inputted until the comparer completes calculating the error and the pixel clock generator completes correcting the pixel clock; and
then output the switching signal.

18. The image writing device according to claim 14, wherein the plurality of groups of values is identically configured.

19. The image writing device according to claim 14, wherein the pixel clock generator is further configured to average a plurality of error values and correct the pixel clock based on the average of the plurality of error values.

20. The image writing device according to claim 14, wherein the pixel clock generator is further configured to set the pixel clock frequency based on the error and the target value.

* * * * *